July 23, 1940.  J. E. DE LONG  2,208,750
INTERNAL COMBUSTION ENGINE
Filed Nov. 19, 1937  6 Sheets-Sheet 4

Inventors:
James E. De Long,
James B. Fisher.
By Brown, Jackson, Boettcher & Dienner
Attys July 23, 1940.   J. E. DE LONG   2,208,750
INTERNAL COMBUSTION ENGINE
Filed Nov. 19, 1937   6 Sheets-Sheet 5
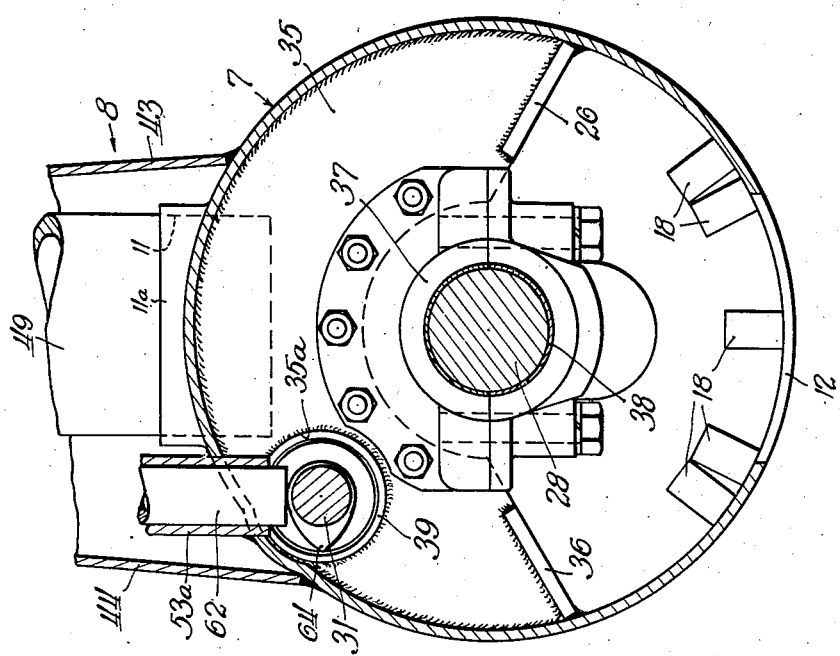
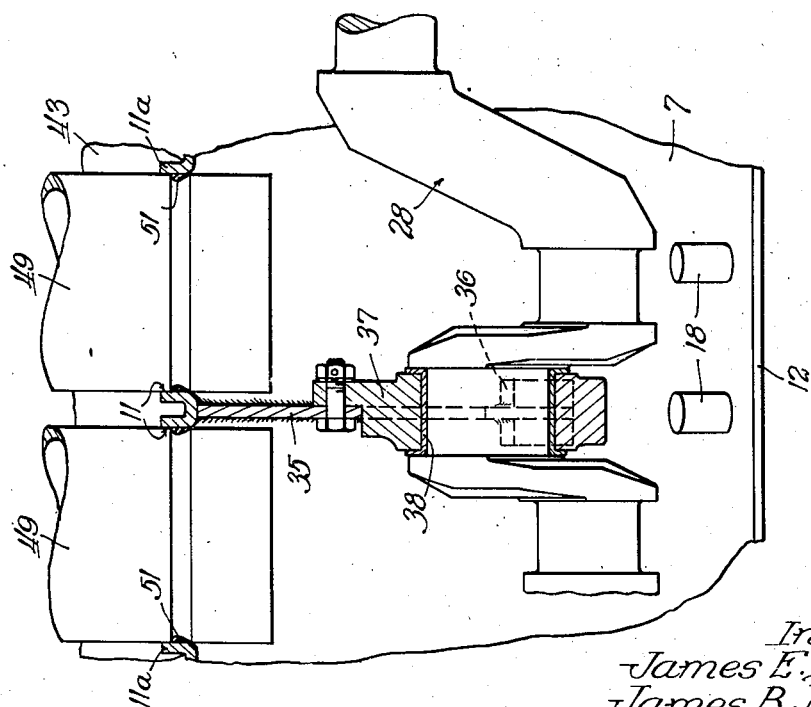
Inventors:
James E. DeLong,
James B. Fisher.
By Brown, Jackson, Boettcher & Dienner
Attys.

Patented July 23, 1940

2,208,750

UNITED STATES PATENT OFFICE 2,208,750

INTERNAL COMBUSTION ENGINE

James E. De Long and James B. Fisher, Waukesha, Wis., assignors to Waukesha Motor Company, Waukesha, Wis., a corporation of Wisconsin Application November 19, 1937, Serial No. 175,484

11 Claims. (Cl. 123—195)

This invention relates to internal combustion engines and contemplates such an engine constructed, in large part, of steel plate and preferably with welded joints.

It is known to provide engines having welded steel skeleton frames, particularly in large units. In such engines, the skeleton framework is the truss structure, which carries the load and meets the stresses, and the enclosing walls and associated elements of the frame are of negligible effect in that respect. Engines constructed in this manner are well suited to their intended uses, but they are too heavy for many uses and are also expensive to manufacture, in both material and labor.

Steel plate is of comparatively light weight for given mechanical strength; it lends itself to relatively inexpensive processes of manufacture, such as rolling, drawing and stamping, and to welded joints, which facilitate assembly and are efficient and relatively inexpensive; and it is adaptable to tubular formations, which are characteristically strong. Our invention is directed to an engine in which the crank case, cylinder block and appurtenant parts are constructed of steel plate, and in such a way that the enclosing walls themselves constitute the load carrying and stress meeting means, the elements being so combined as to furnish mutual support and give abundant rigidity to the structure as a whole, notwithstanding its light weight.

It is also part of our invention to provide a cylinder head of steel plate construction.

Subordinate features will appear and will be pointed out as this description proceeds.

Our invention is illustrated in the accompanying drawings, in which—

Figures 6 and 7 are, respectively, axial and cross sections of the central portion of the crank case, showing the intermediate crank shaft bearing and its mounting.

Figure 1:
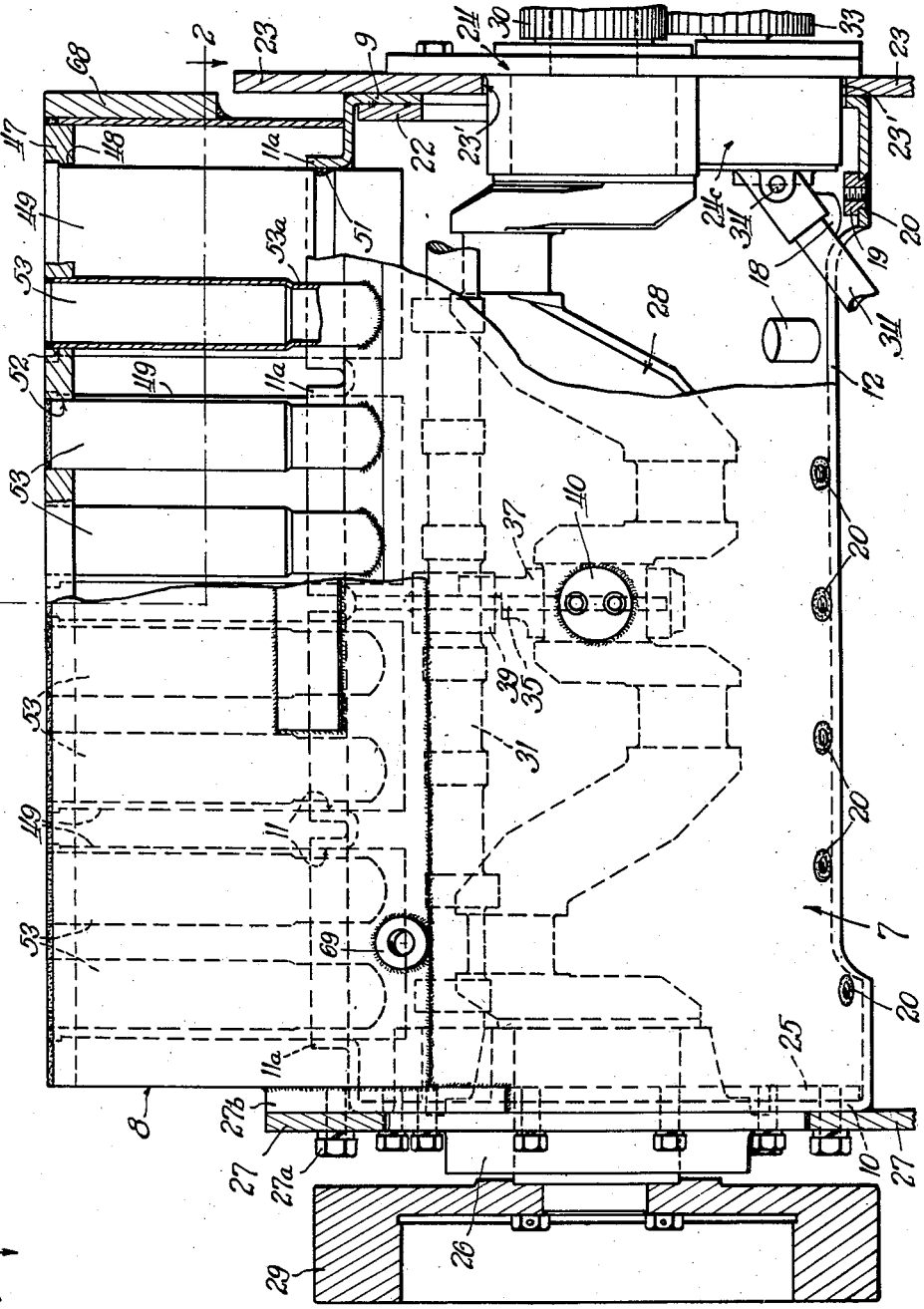
Figure 1 is a side elevational view of the crank case and cylinder block of the engine of our invention, parts being broken away and shown in section, the crank shaft, cam shaft and other directly related parts being also shown in this figure.
Figure 2:
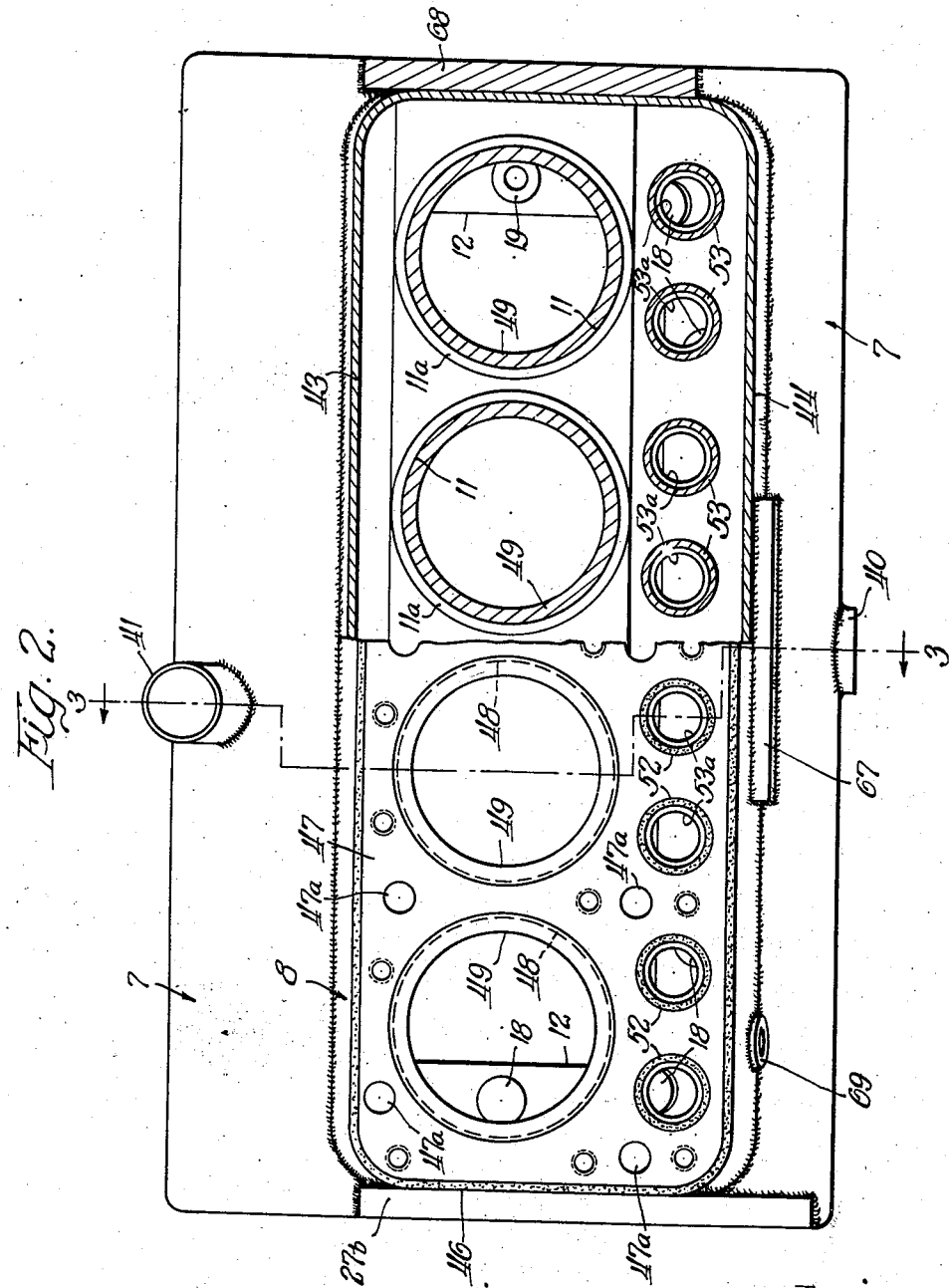
Figure 2 is a view, partly in plan and partly in horizontal section, taken on the planes of the line 2—2 of Figure 1, the crank shaft, cam shaft, and the parts directly related thereto being omitted.

The engine illustrated in Figures 1 to 7, inclusive, is an overhead valve engine, and its crank case and cylinder block are designated generally by the reference characters 7 and 8.

Crank case 7 is of steel plate of appropriate gauge and temper and of tubular form, preferably of one piece of metal and of substantially circular cross section, fabricated by drawing or otherwise as understood in the metal working art. Such a structure is characterized by great mechanical strength for the amount of metal in it.

The ends of this tubular element are turned inwardly to form flanges 9 and 10, respectively, the top is provided with a series of cylinder openings 11, 11, rimmed by preferably integral upwardly extending collars 11a, 11a, and the bottom is cut out to form a long and wide opening 12, for a purpose to be pointed out presently. The flanges 9 and 10 and collars 11a, 11a, contribute to the rigidity of the structure as a whole.

Oil pan 13, also of steel plate (it can be of lighter gauge), is secured to the bottom of the crank case 7. This pan is also preferably of one piece of metal, drawn or stamped to shape, with a flange 14 by which it may be secured in place. Cap screws 15, 15 are employed for this latter purpose, a gasket 16 intervening to make the joint oil tight and lock washers 17 intervening for obvious purposes. If the thickness of the metal in the crank case body is not regarded as sufficient for drilling and tapping to receive the fastening cap screws, the openings therein can be punched to form a rim which can be tapped, or blocks 18 and 19 may be welded in the openings, as shown at 20, which blocks, in turn, are drilled and tapped to receive the cap screws. The oil pan is of such form that it may be made effective as a reinforcing member, particularly in the case of a long engine, serving materially to strengthen the crank case with respect to transverse stresses and strains and to resisting any tendency thereof to spread laterally at its lower portion. The oil pan is also provided with a suitably disposed drainage opening, closed by a screw plug 21.

Plates 22, of arcuate shape and formed of relatively thick steel plate, are suitably secured, preferably by spot welding, to the inner face of flange 9. A supporting plate 23 is secured to that end of the crank case, i. e., to the outer face of the flange 9, preferably by means of cap bolts passing through the flange and taking into the plates 22. A housing 24 is bolted to the plate 23, extending inwardly through the opening 23' therein (the flange 9 being cut out where necessary to accommodate the housing) and this housing contains the crank shaft bearing 24a, the cam shaft bearing 24b, and oil pump 24c, as particularly shown in Figure 5. Plates 22 and 23 serve materially to reinforce flange 9.

A plate 25, generally similar to the plates 22, is suitably secured, preferably by spot welding, to the inner face of flange 10. A housing 26 is bolted to the flange 10, extending inwardly (the flange 10 being cut out where necessary to accommodate the housing) and this housing contains the crank shaft bearing 26a and the cam shaft bearing 26b, as particularly shown in Figure 4.

A mounting plate 27, of relatively thick steel plate, cut out centrally to accommodate the housing 26, is secured to that end of the crank case, i. e. to the outer face of the flange 10, preferably by means of cap bolts 27a passing through the flange and taking into the plate 25. This plate, with the plate 25, serves materially to reinforce flange 10, and may be used in mounting the engine, and for carrying other parts which need not be here described.

The crank shaft 28 is mounted in the bearings 24a and 26a, as shown in Figures 1, 3, 4 and 5, carrying flywheel 29 beyond the latter bearing, where clutching means (not shown) is also provided, and a gear 30 beyond the former bearing, where a belt pulley (not shown) may also be carried.

The cam shaft 31 is mounted in the bearings 24b and 26b, as shown in Figures 1, 3, 4 and 5, carrying beyond the former bearing the gear 32 which meshes with the gear 30, which also meshes with the gear 33 by means of which the pump 24c is operated. Parts of the oil line, to and from the pump, are indicated at 34.

The crank shaft 28 may have an intermediate bearing, as illustrated particularly in Figures 6 and 7. A member 35, of steel plate and of arcuate shape, extends transversely of the crank case 7, at the upper portion thereof, and is welded thereto. At the two lower ends, a steel plate web piece 36 is welded to form a T cross-section for strengthening purposes, these pieces being also welded to the crank case wall as indicated. A housing 37 is bolted centrally to the member 35, and this housing carries the bearing 38 in which the crank shaft is mounted. The member 35 is cut out at 35a to accommodate the cam shaft, and this opening may be rimmed by a short length of tubing 39, welded to the member 35 as shown, for strengthening purposes.

A cylindrical plug 40 is welded in one side of the crank case 7, this plug being suitably drilled and tapped for oil line connections. A short tube 41 is also welded into the crank case wall for the reception of an oil gauge comprising the cap 42 and gauge rod 42a.

The crank case assembly thus described is simple, inexpensive to manufacture, light, and of great strength.

The cylinder block 8 is formed primarily by a structure of steel plate, substantially rectangular in form, comprising the two side walls 43 and 44 and the two end walls 45 and 46, which may either be of one piece or four pieces welded together. As will be seen, this structure forms a water jacket. These walls are welded at their bottoms to the top of the crank case 7 throughout their lengths, forming a water tight joint, the rectangular structure as a whole surrounding and being spaced from the cylinder openings 11. The top of this rectangular structure is provided with a horizontal cover 47, also of steel plate, welded thereto, making a water tight joint, this cover being preferably of considerably greater thickness. The cover 47 is provided with cylinder openings 48, 48 in axial alignment with cylinder openings 11, 11 in the crank case, and each of these openings is rabbeted for the reception of shoulders on the cylinders 49, 49 which pass through the openings 48, 48 and down through the openings 11, 11. These cylinders are thus suspended from the cover 47 and they fit snugly within the collars 11a, 11a. Each cylinder is provided, a short distance above its lower end, with a circumferential groove which receives a packing member 51, of rubber or composition, to provide a water tight seal between the cylinders and the crank case. The cylinders may be cast or of steel plate. The tops of the cylinders are flush with the top surface of the plate 47, and the latter is provided with water openings 47a for communication with the water jacket of the head which is to be applied, as will be described presently.

Figure 3:
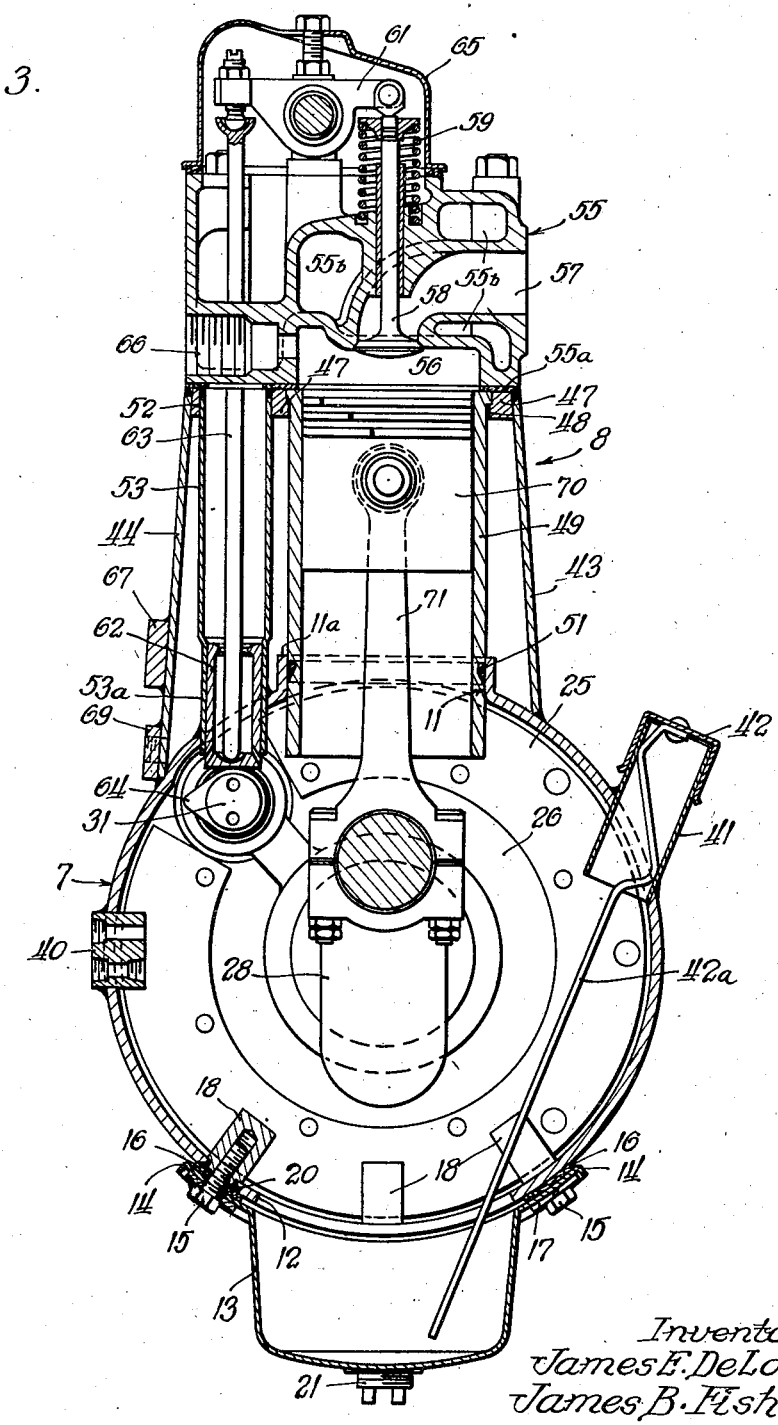
Figure 3 is a vertical cross-sectional view, taken substantially on the planes of the line 3—3 of Figure 2.
Figure 4:
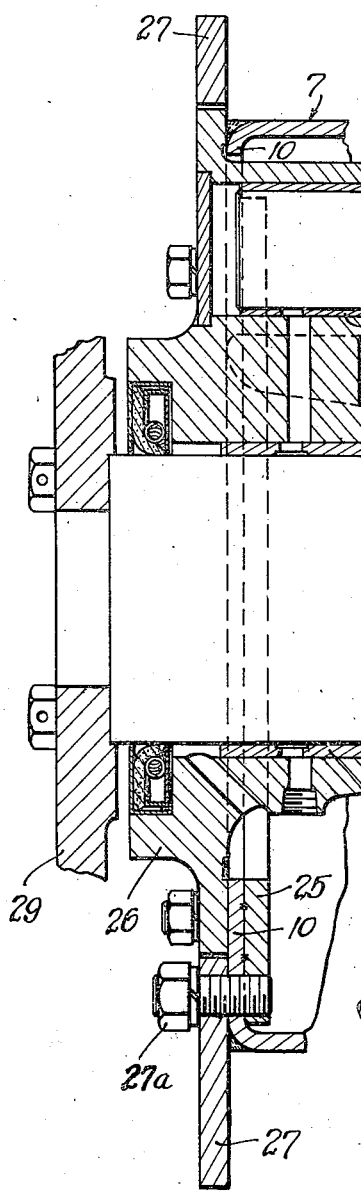
Figures 4 and 5 are longitudinal sectional views respectively of the two ends of the crank case, taken on planes to show the crank shaft, cam shaft and pump mountings.
Figure 5:
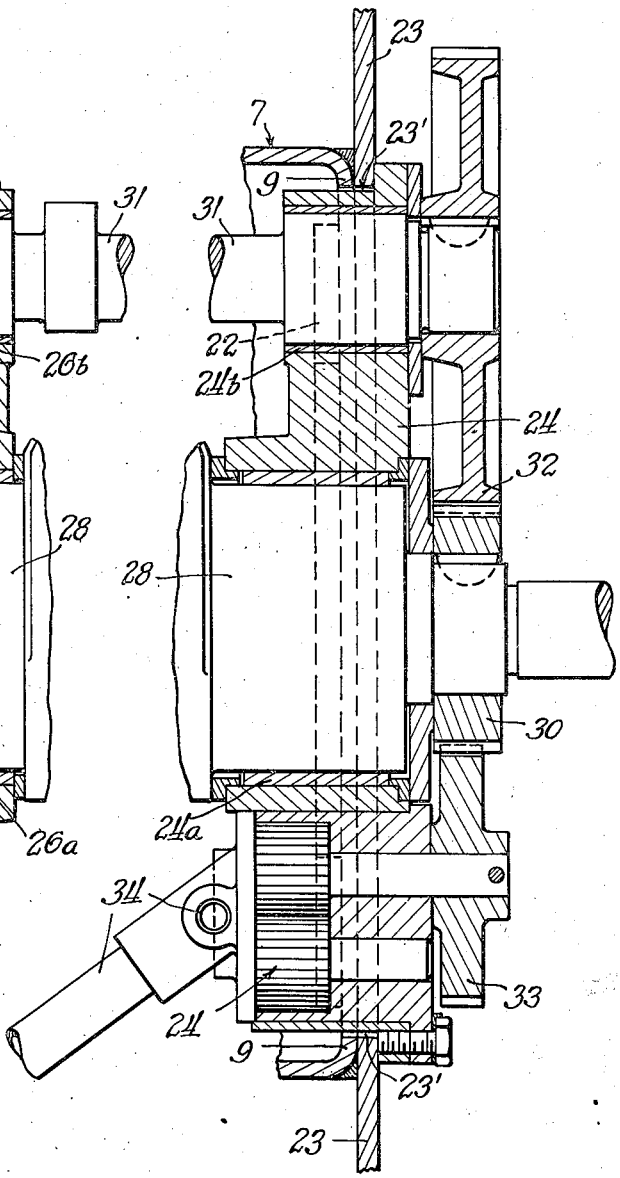

The cover 47 is further provided, to one side of the series of cylinder openings therein, with a series of smaller openings 52, 52, two for each cylinder, to receive the upper ends of push rod and tappet guide tubes 53, 53, also of steel plate, each of which is welded, at the top, to the cover, as best shown in Figures 1 and 3. The lower end portions of these tubes 53 are reduced in diameter, as shown at 53a, and extend down through openings, in which they fit, in the top of the crank case 7, the joints between these tubes and crank case being welded and water tight. It will now be seen that the space defined by the rectangular wall structure, the top of the crank case, the cover 47, the cylinders, and these tubes 53, constitutes a water jacket for the cylinders. The tubes 53 serve as reinforcing members for the cylinder block. A filler 27b is provided between the mounting plate 27 and the adjacent end wall of the rectangular structure. The side walls of the rectangular structure are inclined upward and inward, the better to resist lateral stresses and strains, and the various enclosing members which have been described cooperate for mutual reinforcement in such a way as to provide an extremely rigid and strong structure as a whole, notwithstanding its light weight.

The engine illustrated in the figures thus far referred to is an overhead valve engine. The tubes 53 are in lengthwise alignment directly over the cam shaft, each in line with a cam, and through them the action of the cams is transmitted to the mechanism in the head, which will now be described. The head, shown in Figure 3, is a cast iron head, and this kind of a head may be applied if desired. The head is indicated generally by the reference character 55, and it is secured, with a gasket 55a intervening, upon the cover 47, by means of suitable cap bolts. The head provides the combustion chambers 56, one overlying each cylinder, and inlet and exhaust passages for each combustion chamber, one of which passages is shown at 57. Each passage is controlled by a valve 58 normally held closed by a spring, as is usual. The stem of each valve is engaged by a suitably pivoted rocker arm 61 operated, by way of a tappet 62 and a push rod 63, by the corresponding cam 64 on the cam shaft. In fabricating the tubes 53, the reduced lower ends 53a are formed to a working surface for the tappets 62, and the latter are thus mounted within such reduced ends directly with a bearing fit.

The head 55 is provided with an auxiliary sheet metal housing 65, covering the valve operating mechanism, and is also provided, at one side thereof, with a spark plug opening 66 for each combustion chamber. The head is water jacketed, as shown at 55b, this water jacket communicating with the water jacket of the cylinder block by way of the openings 47a previously referred to.

Blocks of thick steel plate 67 and 68 may be welded to the outside of the rectangular cylinder block structure, for the mounting of accessories, and a block 69 may also be welded thereto, as indicated in Figure 3, for the reception of a drain cock for the water jacket.

Each of the cylinders 49 receives a piston 70, connected with the crank shaft 28 by means of the connecting rod 71. The cam shaft 31 is, of course, properly timed with the crank shaft in order that the valves may be operated at the proper times. In principle of operation, the engine may be taken as standard, the invention, as above explained, being directed to its construction.

Figure 8:
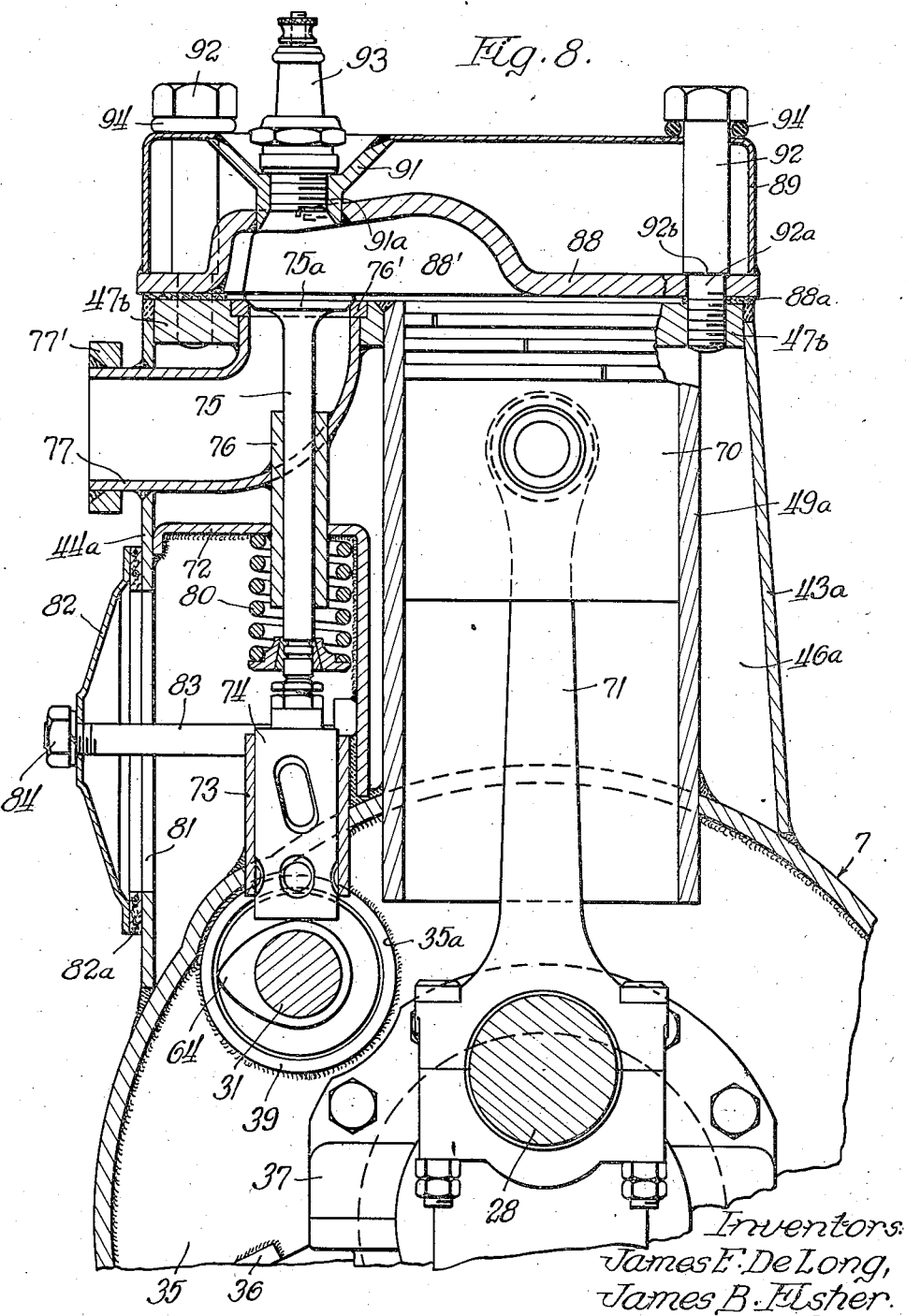
Figure 8 is a view similar to Figure 3, on a somewhat larger scale, showing an L-head engine embodying our invention, the head of the engine being of steel plate construction.

Figure 8 serves the double purpose of illustrating the adaptability of the main features of our invention, as above described, to an L-head engine, and of illustrating a novel construction of head. We shall first describe the construction of this type of engine as a whole.

The crank case, crank shaft and cam shaft construction and arrangement are the same as described above in connection with an overhead valve engine, the only difference being that in this instance the cylinder openings are not provided with surrounding collars.

The cylinder block comprises the rectangular structure having the steel plate side walls 43a and 44a and two end walls, one of which is shown at 46a. These walls are welded at the bottom, throughout their length, to the top of the crank case, and are provided at the top with the relatively thick steel plate cover 47b, welded thereto as above described. The cylinders, one of which is shown at 49a, are mounted in aligned openings in the cover 47b and the top of the crank case, the joints being welded as indicated.

A steel plate member 72, of substantially L-shaped cross section, extends lengthwise from end to end in the space between the wall 44a and the cylinders, welded along one edge to that wall, along the other to the top of the crank case, and at the ends to the end walls of the rectangular cylinder block structure. This, as will be seen, partitions off the water jacket.

Above the cam shaft, as in the case of the engine previously described, the crank case is provided with a series of openings, two for each cylinder, in each of which a tappet guide tube 73 is welded, these being also conveniently welded to the vertical side of the member 72 as shown. This guide tube, which is of steel plate, is formed to an internal bearing surface in which the tappet 74 is mounted for reciprocation. This tappet engages the valve stem 75 which is mounted for reciprocation in the steel tube 76 welded in the horizontal part of the member 72. The valve stem 75 has the valve 75a which, cooperating with the valve seat 76', controls an opening in the cover 47b, which is the inlet or exhaust opening for the combustion chamber which will be referred to presently. An elbow 77, of steel tubing, leads from this opening, through the wall 44a, and this elbow is welded to the cover 47b and the wall 44a as indicated. The elbow, at its outer end, is provided with the flange member 77', welded thereto for manifold attachment; the horizontal arm of the elbow extends a distance beyond the wall 44a in order to space the manifold from the block. The tube 76 passes through the wall of the elbow and is welded thereto as shown. A spring 80 normally holds the valve closed.

Wall 44a is provided with the opening 81, normally closed by a steel plate cover 82, a gasket 82a intervening, this plate being held in place by nuts 84 threading on studs 83, extending from the vertical side of the member 72. Thus, a separate compartment for the valve operating mechanism, accessible by removing the cover 82, and a water jacket defined by the cylinders, the rectangular cylinder block structure, the cover 47b, the top of the crank case, and the member 72 are formed.

Coming now to the cylinder head, this comprises primarily the member 88, of relatively thick steel plate, recessed to form the combustion chambers 88', one for each cylinder, overlying the cylinders, or portions thereof, and two openings controlled by valves 75a, one an inlet opening and the other an exhaust opening. Here, again, the principle of operation may be taken as standard, the invention lying in the construction.

The member 88 lies on top of the plate 47b, the gasket 88a intervening. A dished member 89, of relatively thin steel plate, is seated on the top of member 88 to form a water jacket, as will be seen presently. This member 89 is welded to the member 88 as shown, and a tubular flared fixture 91 is welded between the two, thus providing for the spark plug 93 and completing the closure of the water jacket except for the points now about to be mentioned.

The head assembly which has thus been described is secured to the cylinder block by a number of suitably disposed bolts 92, each having its threaded lower end portion 92a reduced to form a shoulder 92b. The bolt is passed through an opening in the top of the member 89, the distance between the under side of the head of the bolt and the shoulder 92b being such as to permit the intervention of a compressible ring 94. The bolt screws into the cover 47b and the reduced portion 92a passes through a corresponding opening in the member 88, so that the clamping effect is between the plate 47b and the shoulder 92b. At the same time, however, the head of the bolt is brought down upon the compressible ring so as to seal the opening in the member 89 through which it passes. Also, the member 88 and cover 47b are provided with aligning water holes, whereby the water jacket of the cylinder block may be in constant communication with the water jacket of the head.

The head just described is a novel and desirable form of head per se, employable whether or not the engine otherwise is constructed as described.

It will be apparent that changes and modifications can be made without departing from the spirit and scope of our invention, particularly as set forth in the broader of our appended claims. Certain features can be utilized without utilizing others; for instance, certain features can be retained even if the engine is of the type in which the cam shaft is mounted on the head; and even if the engine is otherwise than water cooled. Also, our invention is applicable to V-type engines, and engines of opposed cylinder designs, and also to injection engines which have heretofore necessarily been of heavy construction. Our invention reduces the necessity of patterns and of machining in the building of an engine, to a few small parts, and an important advantage lies in the elimination of scrap loss, which is such an item of expense where castings are used, i. e. oftentimes much labor is expended on a casting before it is discovered to be defective, and this is particularly true of crank case and cylinder block castings because of the complicated nature thereof. Also, in such castings, there is always a considerable amount of sand on the surface, which, during subsequent operation of the engine, loosens, and contaminates the lubricating oil. That is a sufficient source of trouble to warrant enameling of the surface in order to seal in the sand, but even that is not entirely satisfactory because it is found that the enamel breaks loose. With plate steel there is a smooth, clean surface, and this also is an advantage in the exterior finishing of the engine.

A further advantage lies in the fact that breakage due to freezing of water in the jackets is not likely to occur, this because of the strength and ductility of steel plate, a feature which also makes the engine more immune to injury from shocks and impacts. Also, there is advantage from the standpoint of repairs, for steel plate parts can be welded or reformed, whereas cast parts have to be discarded entirely and replaced.

We claim:

1. In an internal combustion engine, a crank case comprising a steel plate tube of substantially circular cross section, having the ends thereof turned inwardly, bearing housings secured to said inwardly turned ends, and a crank shaft mounted in said bearing housings.

2. In an internal combustion engine, a substantially cylindrical steel plate crank case having cylinder openings at its top and provided at its ends with inwardly projecting flanges, supporting members secured to the outer faces of said flanges effective for reinforcing the latter, a cylinder block secured on said crank case, and cylinders mounted in said block and extending downward through said openings.

3. In an internal combustion engine, a substantially cylindrical steel plate crank case having cylinder openings at its top and provided at its ends with inwardly projecting flanges, said crank case having an opening at its bottom, a steel plate oil pan secured to the bottom of said crank case beneath said bottom opening, a cylinder block secured on said crank case, and cylinders mounted in said block and extending downward through said openings.

4. In an internal combustion engine, a substantially cylindrical steel plate crank case having cylinder openings at its top and provided at its ends with inwardly projecting flanges, a bearing housing supporting member of steel plate within said crank case extending transversely of the latter at substantially the mid-length thereof and welded thereto, a cylinder block secured on said crank case, and cylinders mounted in said block and extending downward through said openings.

5. In an internal combustion engine, a substantially cylindrical steel plate crank case having cylinder openings at its top and provided at its ends with inwardly projecting flanges, an arcuate bearing housing supporting member extending transversely within said crank case at the upper portion thereof and being welded thereto, steel plate reinforcing strips welded to the ends of said supporting member and to the sides of said crank case, a cylinder block secured on said crank case, and cylinders mounted in said block and extending downward through said openings.

6. In an internal combustion engine, a tubular steel plate crank case having cylinder openings at its top, a steel plate enclosing structure substantially rectangular in plan extending upward from said crank case about said openings and welded at its lower edge to said crank case, a steel plate cover welded to the top of said enclosing structure, cylinders mounted in said cover and extending downward therefrom through said openings, and a cylinder head secured upon said cover.

7. In an internal combustion engine, a crank case, a cylinder block and head mounted thereon, valves for said cylinder block and head, a cam shaft mounted in said crank case, and a series of steel tubes mounted in said cylinder block and crank case over said cam shaft, said tubes being formed to receive tappets with bearing fit in their lower ends, and means for operating said valves from said cam shaft through said tubes.

8. In an internal combustion engine, a tubular steel plate crank case having cylinder openings at its top and tube-receiving openings adjacent said cylinder openings, a steel plate wall construction substantially rectangular in plan extending upward from said crank case about said openings and welded at its lower edge to said crank case, a steel plate cover welded to the top of said water jacket, cylinders hung in said cover and extending downward therefrom through said cylinder openings, steel tubes extending downward from said cover through said tube receiving openings and welded to said cover and to said crank case, and a cylinder head secured upon said top plate.

9. In an internal combustion engine, a tubular steel plate crank case having at its top integral collars defining cylinder openings, said case also having tube receiving openings adjacent said collars, a steel plate water jacket substantially rectangular in plan extending upward from said crank case about all of said openings and welded at its lower edge to said crank case, a steel plate cover welded to the top of said water jacket, cylinders suspended from said cover and extending downward therefrom through said collars with a sealing and sliding fit, steel tubes extending downward from said cover through said tube receiving openings and welded to said cover and to said crank case, and a cylinder head secured upon said top plate.

10. In an internal combustion engine, a tubular steel plate crank case having cylinder openings at its top, a steel plate cylinder block comprising side and end walls extending upward from said crank case about said openings and welded at their lower edges to said crank case, a steel plate cover welded to the upper edges of said walls, cylinders mounted in said cover and extending downward therefrom through said cylinder openings, and a partition of inverted L cross section within said cylinder block adjacent one side of the latter extending lengthwise thereof and welded thereto and to said crank case.

11. In an internal combustion engine, a tubular steel plate crank case having cylinder openings at its top, a steel plate cylinder block comprising side and end walls extending upward from said crank case about said openings and welded at their lower edges to said crank case, a steel cover welded to the upper edges of said walls, cylinders extending downward from said cover and through said cylinder openings, a partition of inverted L cross section within said cylinder block adjacent one side of the latter extending lengthwise thereof and welded thereto and to said crank case, valve tapet guide tubes opening through said crank case and welded thereto, elbows above said partition opening at their upper ends through said cover and extending through the adjacent side wall of said cylinder block, said elbows being welded to said adjacent side wall and said cover, and valve stem guide tubes aligned with said tappet guide tubes extending through and welded to said elbows and the top of said partition.

JAMES E. DE LONG.
JAMES B. FISHER.